Figure 1:
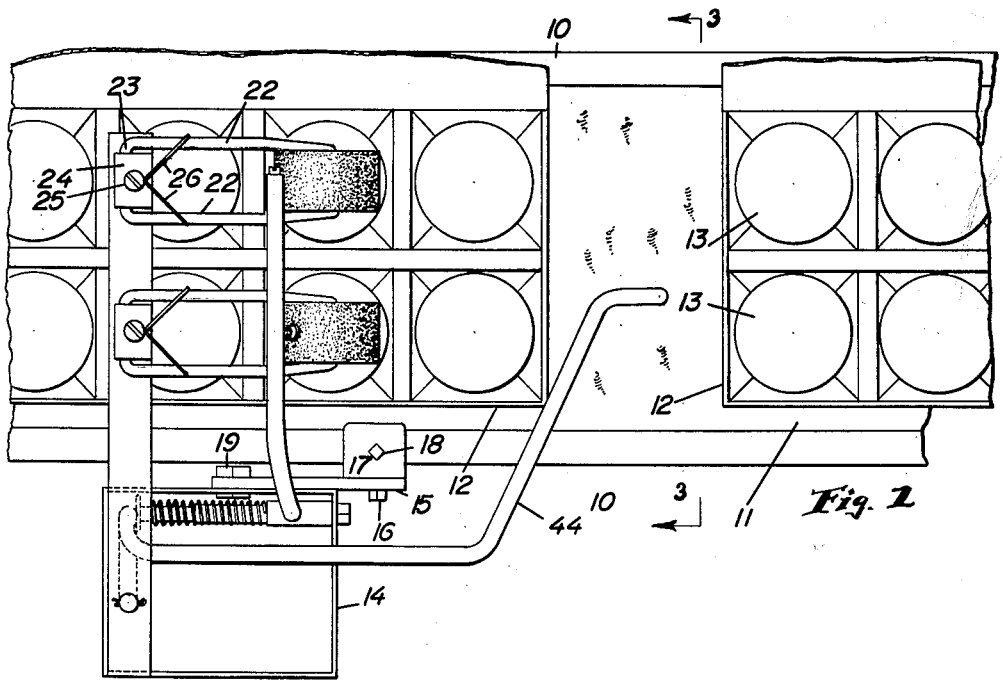

Feb. 26, 1963

N. S. McEWEN 3,078,821

EGG OILER

Filed Feb. 9, 1961

2 Sheets-Sheet 1

INVENTOR
Norman S. McEwen by Douglas R. Olson

ATTORNEY

Feb. 26, 1963   N. S. McEWEN   3,078,821
EGG OILER
Filed Feb. 9, 1961   2 Sheets-Sheet 2

INVENTOR
Norman S. McEwen by
ATTORNEY

United States Patent Office 3,078,821
Patented Feb. 26, 1963

3,078,821
EGG OILER
Norman S. McEwen, Fort Lauderdale, Fla., assignor to Ephriam Adkins, Oakland Park, Fla.
Filed Feb. 9, 1961, Ser. No. 88,109
4 Claims. (Cl. 118—2)

This invention is an egg oiler, the primary object of which is to provide means operating automatically upon exposed surfaces of eggs in passing along a conveyor to seal the air cell in the egg thus to preserve its freshness.

The present invention involves mechanism wherein means are provided along and above the path of travel of groups of eggs to apply to the upper surfaces thereof a desired quantity of sealing fluid, such as mineral oil or other suitable liquid substances, to seal the air cell for the purposes stated, and wherein improved means are provided for bringing about a positive contact between the sealing means and the exposed egg surfaces to bring about a proper coating of the latter and insuring a uniform coating to all eggs treated in the operation.

A further object of the invention is to provide oiling means wherein the oil applying surfaces are provided with proper and equal quantities of the sealing fluid so as to bring about a uniformity of product and a conservation of the sealing fluid.

A further object is to provide means whereby eggs arranged within the familiar cartons and placed upon a travelling belt may have their upper exposed ends subjected to the oil treating operation, and wherein the movement of the egg cartons in its progress through the machine brings about operation of suitable pumping mechanism to force the sealing liquid from a reservoir to a point of distribution adjacent to the liquid applying elements.

With the foregoing objects in view, together with others which will appear as the description proceeds, the invention resides in the novel construction, combination and arrangement of parts, all as will be described more fully hereinafter, illustrated in the drawing, and particularly pointed out in the claims.

Figure 2:
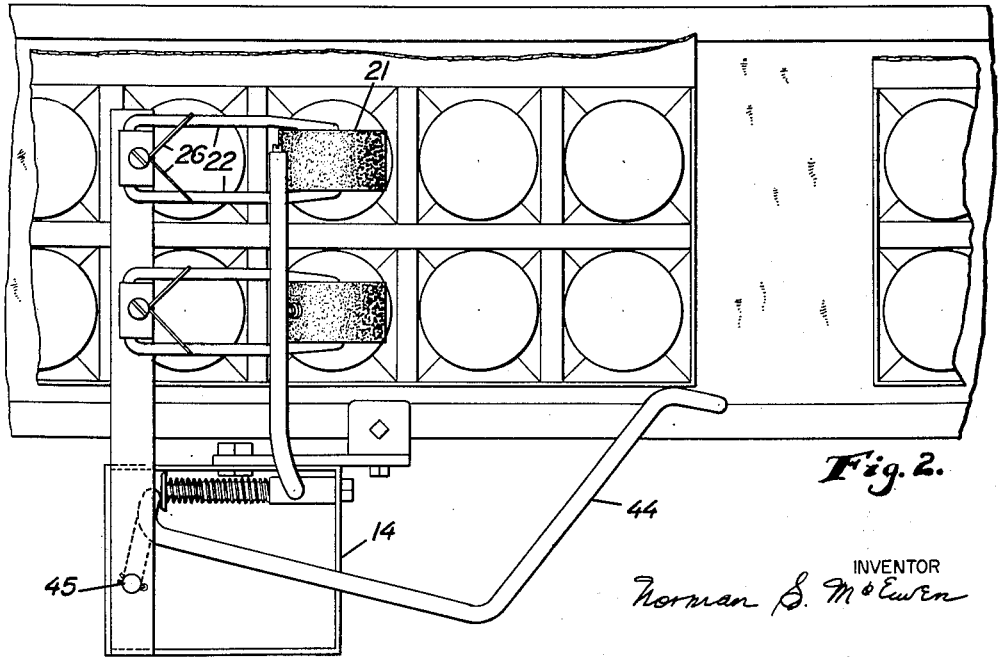
Figure 3:
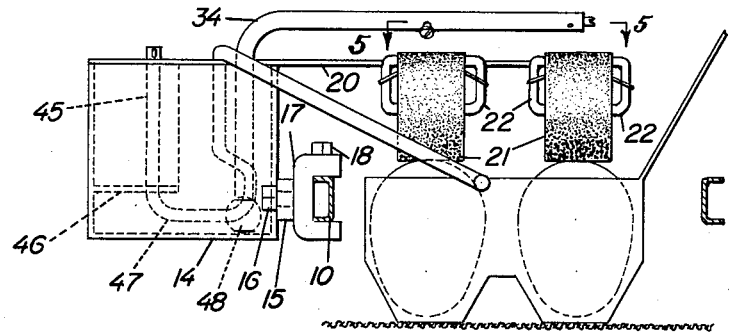
Figure 4:
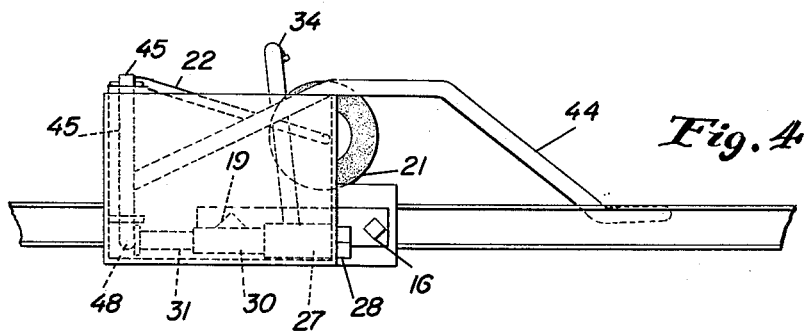
Figures 5, 6:
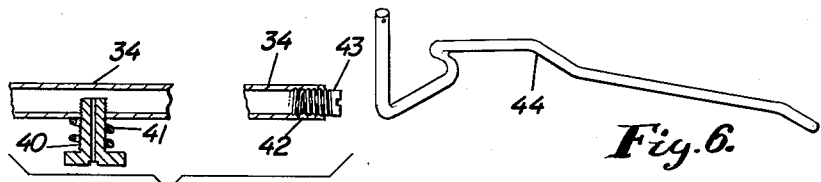
Figure 7:
Figure 8:
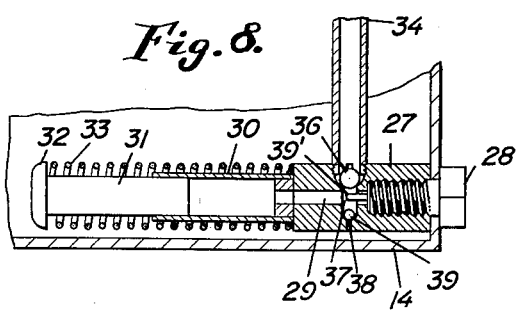

In the drawings:

FIG. 1 is a top plan view of egg oiling apparatus constructed in accordance with the invention, FIG. 2 is a similar view showing a carton moved to such position through the machine as to bring about operation of the liquid pump, FIG. 3 is a sectional view taken substantially upon the line 3—3 of FIG. 1, FIG. 4 is a side elevation of the oil applying apparatus per se, FIG. 5 is a detail view of the oil distributing tube, taken upon line 5—5 of FIG. 3, FIG. 6 is a perspective view of the oil pump actuating lever, FIG. 7 is a fragmentary view of the lower end of the oil conduit, and FIG. 8 is a detail sectional view showing the general construction of the oil pump.

Referring now more particularly to the drawing, 10 represents a supporting frame upon which is located a travelling conveyor or belt 11 to support cartons 12 each having spaced apart longitudinal series of cells for the reception of eggs 13 in upstanding position. These cartons are of the type usually employed in packaging eggs for the retail trade. It is the purpose of the invention, after the eggs have been properly inserted in the various cells in their respective cartons, to dispose these cartons with the upper flat open in longitudinal alignment upon the travelling apron or belt 11 so that they may move at a desired speed from one end to the other of the said conveyor, and during his movement are to be operated upon in such manner as to seal the air cell at the top of each of the eggs in the various box compartments.

Arranged upon one side of the frame 10 is a reservoir or container 14 for the fluid utilized in bringing about the sealing operation. This container may be secured to the frame 10 by a link 15 attached at one end by a bolt 16 to the clip 17 which, in turn, is secured to the frame 10 by a bolt 18; the opposite end of the link 15 being secured as by a bolt 19 to the side of the reservoir or container 14 substantially midway its ends. By manipulation of the bolts 16–19, the reservoir or container 14 may be adjusted vertically to suit the demands of the operation of the machine.

Extending laterally from the upper portion of the reservoir or container 14 and across the path of movement of the egg cartons is an arm 20 which carries spaced apart rollers to engage the upper surfaces of the eggs in each carton as they are carried along the conveyor. These rollers may be formed of rubber, plastic or other material and are provided with sponge type liquid absorbent surface as indicated and are designated at 21. The rollers are spaced apart transversely of the conveyor substantially the distance between the egg containing cells of the cartons so as to engage the protruding upper ends of the eggs precisely in their longitudinal centers to thus cover such exposed surfaces. Each roller is secured between the spaced apart arms 22 of a yoke, the bight portion 23 of which is rotatably supported within a suitable retaining clip 24 secured as at 25 to the arm 20. Spring members 26 are secured to the fastening member 25 and engaged at their outer ends with the arms 20 of the yokes to normally maintain the rollers in depressed or egg engaging position.

Arranged within the container 14 and at the base thereof is a force pump to supply liquid in proper amounts to each of the rollers 21. This pump may take any desired form, however, in the present instance it consists of a pump head 27 of substantially circular form bored at one end to receive a threaded bolt 28 to axially secure the head within the container and adjacent the bottom thereof. This head has a bore 29 extending inwardly from its opposite end which has an enlarged tubular neck 30 concentric therewith and within which operates a piston indicated at 31. This piston is provided at its outer extremity with a head 32 against which bears an expansion spring 33 the opposite end of which is seated against the head 27. From this construction, it is obvious that the piston 31 is held normally in extended position. Tapped into the upper side of the head 27 is a conduit or tube 34, the lower end of which is provided with a slot 35 and a check valve 36 is disposed within the lower end of the tube but a trifle larger in diameter than the interior of the said tube. A transverse bore 37 passes through the head 27 and has a restricted lower end 38 in which seats a second check valve 39. It is obvious from this construction that upon inward movement of the piston 31, liquid contained within the neck 30 will be forced into and upwardly of the tube 34 through the channels or openings 35, at the same time the check valve 39 will be closed. The stem of bolt 28 is provided with an axial projection 39' to prevent the check valve 39 from moving into the tube 34. When the piston 31 is moved outwardly, the check valve 39 will be lifted from its seat, permitting liquid to pass into the bore 37 and thus charging the pump for the next operation.

The tube or conduit 34 extends upwardly beyond the reservoir or container and laterally over the conveyor frame, being disposed adjacent to the upper surfaces of the rollers 21. Any desired means may be employed to govern the drip or flow from the tube 34 to the rollers 21. In the present instance, the tube above one of the rollers may be provided with the nozzle shown more particularly in FIG. 5, said nozzle being indicated at 40, comprising a centrally bored tubular threaded member, encircled by an expansion frame 41. It is apparent that by screwing this nozzle inwardly until it engages the opposite side of the tube, the flow may be cut off, on the other hand, the adjustment may be made so as to deliver a desired quantity of liquid through the bore. The extremity of the tube 34 may be provided with an opening 42 in its lower side which may be maintained in opened or closed position by operation of the threaded stem 43 extending into the extremity of the said tube. It will be understood that the flow through these openings will be carefully gauged by the machine operator in order that a uniform supply of liquid to the sponge type rollers may be maintained.

The means for operating the pump comprises a rocker arm indicated generally at 44. The inner extremity of this arm has an upstanding portion 45 which has bearing in the upper end of the reservoir 14 as well as in the inwardly projecting arm 46. Below the arm 46 (see FIG. 3) the rocker arm has a horizontally extending portion 47, the outer end of which 48 lies against the head 32 of the piston 31. The rocker arm then extends upwardly beyond the top of the reservoir and laterially into the path of travel of the egg containers 12, as indicated clearly in FIG. 1 of the drawing. The construction is such that as the conveyor belt moves to the right, as in FIG. 1, the rocker arm 44 will be engaged by the advancing edge of the egg carton and will be moved to the position shown in FIG. 2, rocking upon its portion 45. In so doing, the piston 31 is depressed by the heel portion 48 of the rocker arm, bringing about closing of the check valve 39 and forcing the fluid behind the piston upwardly past check valve 36, into tube 34 and outwardly into the horizontal portion of said tube to be discharged upon the rollers. As each egg carton passes the mechanism, the rocker arm will return to its normal position (FIG. 1) and the operation is repeated as the several cartons advance. In this manner, each of the eggs in the various cartons will automatically be coated upon its upper exposed surface with a proper quantity of sealing fluid. It is thus seen that the fluid is forced onto the rollers only at times when the machine is in operation, therefore there is no waste of the fluid.

The several parts which constitute the automatic egg sealer are so constructed as to readily operate at all times and are composed of parts so constructed as to be simple in their assembly yet positive in their operation.

The present embodiment of the invention illustrates the oil reservoir attached directly to the machine frame, however, it will be understood that the oil supply could be a drum or other container located either adjacent to or remote from the machine and having a pipe line or hose leading therefrom to the control valve and operated by the pump mechanism shown for introducing the oil to the distributing pipes.

I claim:
1. In an egg oiling machine, travelling conveyor adapted to carry egg boxes in spaced relationship, sponge type rollers disposed above said conveyor to yieldably engage the eggs within said boxes, a reservoir, a tube leading from said reservoir and disposed transversely above said rollers, said tube having openings therein to discharge liquid upon said rollers, a pump in said reservoir, a rocker arm having one end operatively connected with said pump, and the opposite end of said arm disposed in the path of travel of said boxes and to be moved thereby.

2. In an egg oiling machine, a frame having a travelling conveyor adapted to have egg boxes arranged thereon in spaced relationship, a reservoir secured to said frame, an arm extending laterally from said reservoir overlying said boxes, yoke members arranged in spaced parallelism and pivotally mounted upon said arm, rollers rotatably carried by said yoke members, springs tending normally to force said yoke members in the direction of said egg boxes, a pump arranged within said reservoir, a piston for said pump, spring means for normally holding said piston in its outwardly extended position, a head in said pump having a transverse bore, check valves spaced apart from the center of said head in said bore, a tube leading from the upper part of said head beyond said reservoir and extending above said rollers, said tube having openings therein disposed above said rollers, a rocker arm pivoted on a vertical axis at one end within said reservoir, said arm bent upon itself to provide a heel lying against the outer end of said piston, and the opposite end of said rocker arm disposed in the path of travel of said boxes to be engaged successively by the same and to actuate said piston.

3. In an egg oiling machine, means for moving egg boxes in spaced end to end relationship, rollers arranged above said boxes to engage the eggs therein, a liquid containing reservoir, a pump in said reservoir including a piston, a spring normally maintaining said piston in its outwardly extended position, a rocker arm having one end engaged with said piston, the opposite end of said rocker arm disposed in the path of travel of said boxes to be engaged and moved by the latter, said rocker arm when engaged by said boxes operating to move said piston against the tension of said spring, a tube connected at one end with said pump and having its opposite end disposed over said rollers, and said last named tube having discharge openings disposed above said rollers.

4. In an egg oiler, a travelling belt adapted to carry egg boxes arranged in spaced end to end relationship thereon, a reservoir adjacent to said conveyor, an arm extending from said reservoir transversely above said belt and said containers, sponge type rollers movably mounted and arranged in spaced parallelism upon said arm, means for forcing said rollers downwardly in the direction of said egg boxes, a pump in said reservoir, a pipe communicating at one end with said pump and extending at its opposite end above and across said egg boxes and having openings therein to discharge liquid upon said rollers, a piston in said pump for operating the same, a spring normally maintaining said piston in its outwardly extended position, a rocker arm pivotally mounted at one end adjacent to said pump and in contact with said piston, the opposite end of said rocker arm disposed in the path of travel of said boxes to be engaged and moved thereby to move said piston against the tension of said spring.

References Cited in the file of this patent

UNITED STATES PATENTS

| | | |
|---|---|---|
| 1,440,624 | Peters et al. | Jan. 2, 1923 |
| 1,862,380 | Larson | June 7, 1932 |
| 2,296,861 | Matter | Sept. 29, 1942 |
| 2,444,212 | Weaklend | June 29, 1948 |
| 2,747,539 | Peffer | May 29, 1956 |
| 2,747,541 | Chew | May 29, 1956 |
| 2,801,606 | Hensen | Aug. 6, 1957 |